United States Patent [19]
Yamamoto

[11] Patent Number: 6,057,955
[45] Date of Patent: May 2, 2000

[54] OPTICAL MODULATOR AND DRIVE METHOD THEREOF

[75] Inventor: Ryoichi Yamamoto, Kanagawa-ken, Japan

[73] Assignee: Fuji Photo Film Co., Ltd., Kanagawa-ken, Japan

[21] Appl. No.: 09/206,972

[22] Filed: Dec. 8, 1998

[30] Foreign Application Priority Data

Dec. 8, 1997 [JP] Japan ..................................... 9-336881
Dec. 8, 1997 [JP] Japan ..................................... 9-336882
Dec. 8, 1997 [JP] Japan ..................................... 9-336883

[51] Int. Cl.$^7$ ..................................................... G02F 1/03
[52] U.S. Cl. .......................... 359/254; 347/135; 347/136; 359/245; 359/255
[58] Field of Search ..................................... 347/134, 135, 347/136; 359/245, 246, 250, 251, 254, 255

[56] References Cited

U.S. PATENT DOCUMENTS

| 5,416,631 | 5/1995 | Yagi | 359/254 |
| 5,768,003 | 6/1998 | Gobeli | 359/254 |
| 5,835,254 | 11/1998 | Bacon | 359/254 |

FOREIGN PATENT DOCUMENTS

| 58-117521 | 7/1983 | Japan | G02F 1/03 |
| 63-129318 | 6/1988 | Japan | G02F 1/055 |
| 4-372927 | 12/1992 | Japan | G02F 1/03 |

Primary Examiner—Georgia Epps
Assistant Examiner—Margaret Burke
Attorney, Agent, or Firm—Sughrue, Mion, Zinn, Macpeak & Seas, PLLC

[57] ABSTRACT

An optical modulation element is constructed of an electro-optic crystal substrate, which includes individual electrodes arrayed and formed one-dimensionally on one surface of the substrate and also includes a common electrode formed on the other surface in opposition to the plurality of individual electrodes. The portion of the electrode-optic crystal substrate, interposed between the common electrode and each the individual electrode, constitutes an aperture portion. The aperture portion is switched between a light-transmitting state and a light cut-off state by controlling voltage between the opposite electrodes. Light incident on the aperture portion in a direction perpendicular to the arrayed direction of the individual electrodes from one surface of the electro-optic crystal substrate is modulated. Each individual electrode is formed into a shape that partially shares adjacent individual electrodes with a region on the electro-optic crystal substrate in the arrayed direction of the individual electrodes.

8 Claims, 13 Drawing Sheets

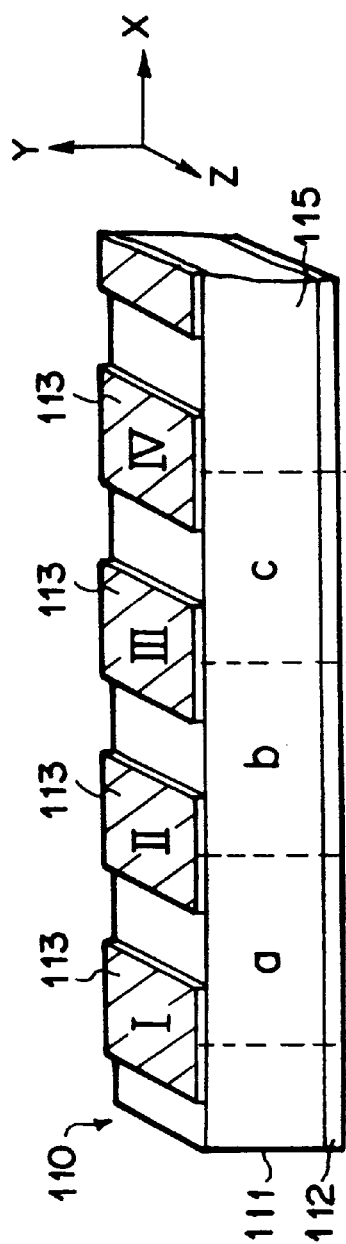
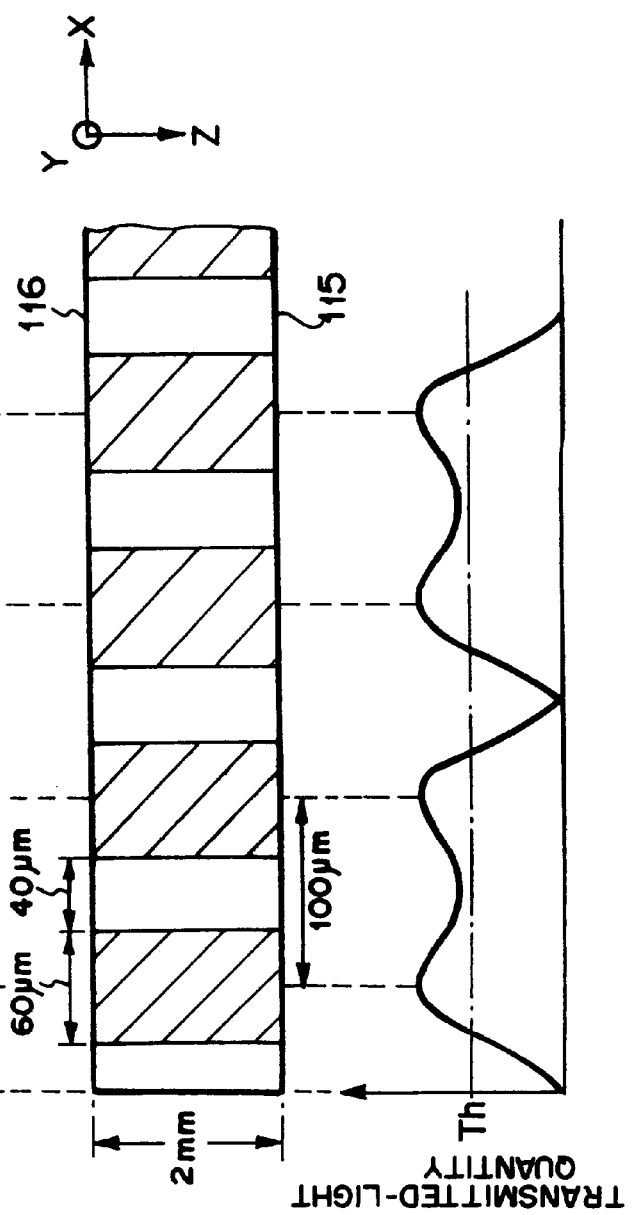
FIG. 6A  FIG. 6B  FIG. 6C

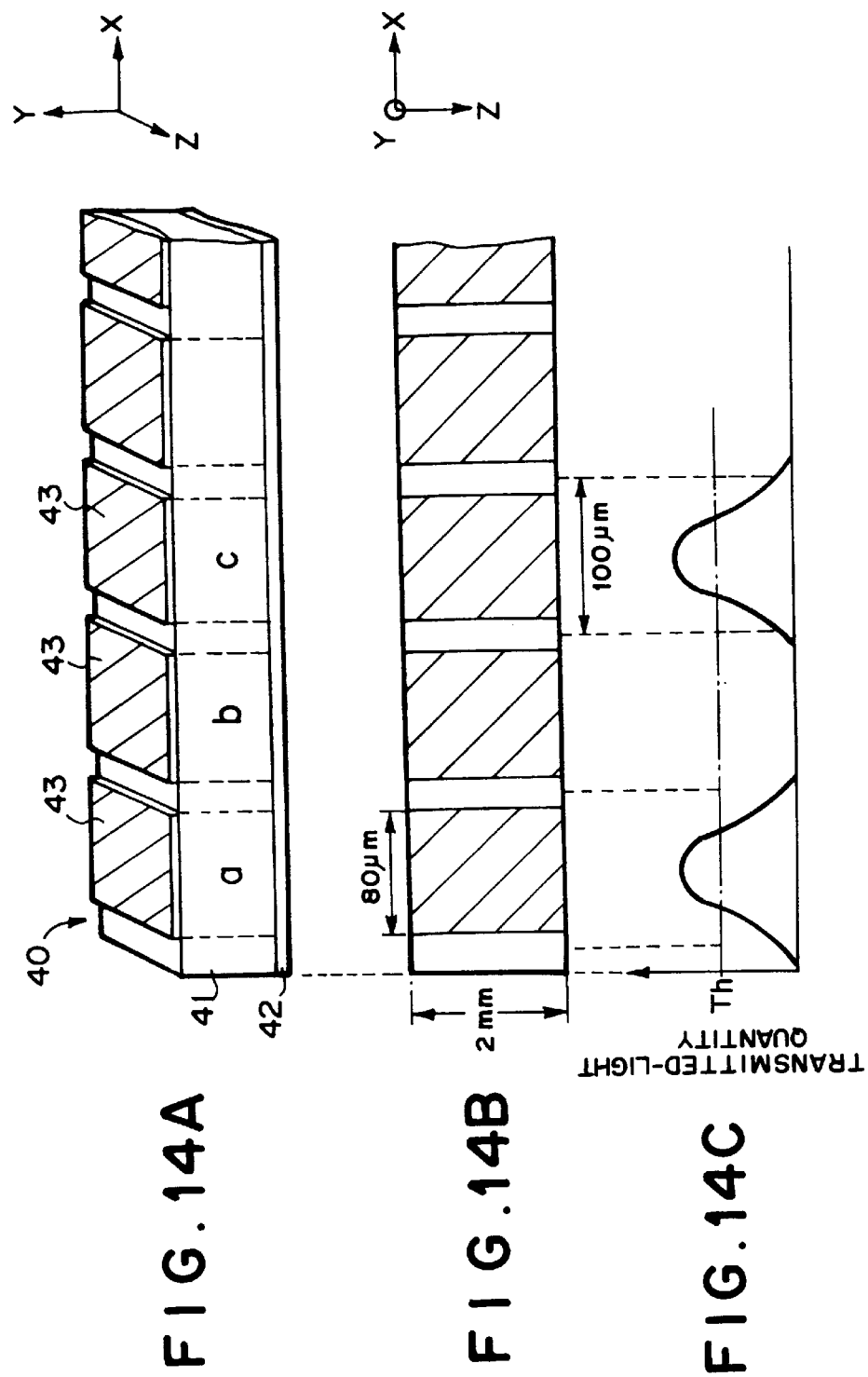

OPTICAL MODULATOR AND DRIVE METHOD THEREOF

FIELD OF THE INVENTION

The present invention relates to an optical modulator equipped with an optical modulation element consisting of an electro-optic crystal and a drive method thereof, the optical modulator being employed in recorders such as laser printers, digital copying machines and the like, primarily in recorders in the printing field which express gradation with mesh points onto binary sensitive material.

DESCRIPTION OF THE RELATED ART

In recorders, such as laser printers, digital copying machines and the like, generally an optical modulation element array consisting of an electro-optic crystal has hitherto been employed.

Japanese Unexamined Patent Publication No. 4(1992)-372927 discloses an optical modulation element provided on one surface of an electro-optic substrate with individual electrodes and on the other surface with a common electrode. The optical path length is lengthened to reduce drive voltage. Particularly, this publication discloses that it is desirable that a physical aperture separating groove be provided between electrodes in order to prevent crosstalk between pixels.

However, in the case of the aforementioned aperture separating groove structure for crosstalk reduction, when sensitive material to be recorded is binary sensitive material that is employed in constituting a mesh-point image such as printing, there arises a problem that an image (line) to be formed will become considerably thin. Even in the case where the aforementioned groove is not provided, there occurs a problem that the aspect ratio of the optical modulation element between electrode width and electro-optic crystal substrate thickness (electrode width/electro-optic crystal substrate thickness) will become small. As the aforementioned aspect ratio becomes smaller, the modulated light that is transmitted is shifted from a rectangle obtained by ideal parallel plate approximation and has a shape similar to a Gaussian distribution. After all, in the formation of an image onto binary sensitive material the image line becomes thin. Note that an end-face incidence type of optical modulation element is often employed with an aspect ratio such as this.

An optical modulation element such as the aforementioned is shown in FIG. 5 by way of example. A conventional optical modulation element 40, shown in FIG. 5A, is provided on one side of an electro-optic crystal substrate (plomb lanthanum zirconate titanate (PLZT) substrate) 41 with a common electrode 42 and on the other side with a plurality of individual electrodes 43. Each individual electrode 43 is formed into a rectangle. FIG. 5B shows a top plan view of the optical modulation element 40. As illustrated in the figure, the aperture pitch is 100 μm. Each electrode 43 has a width of 80 μm in the x-direction, a length of 2 mm in the z-direction, and a thickness of 250 μm in the y-direction. The ratio of (aperture pitch)/(PLZT plate thickness) is 1/2.5. In this optical modulation element, when the continuous apertures a, b, and c are respectively set to a light transmitting state, a light cut-off state, and a light transmitting state, the profile of the transmitted light is shown in FIG. 5C. As shown in the figure, the profile of the transmitted light does not have a rectangular shape that is predicted from parallel plate approximation but a shape similar to a Gaussian distribution. When binary sensitive material or the like is exposed with an optical modulation element having such a profile, an image is formed, for example, only by light having power equal to or greater than a threshold level Th shown in FIG. 5C. For this reason, the image line that is formed on photosensitive material will be thinner than the original aperture pitch. More specifically, when the power threshold level Th at which an image can be formed onto photosensitive material is 80% of the peak power, the width of a line image is 0.65 times the aperture pitch. When adjacent apertures are both in their light transmitting states, the thinning of a line is reduced because the light transmitting states overlap each other at the respective end portions. However, when adjacent apertures are in non-transmitting states, as described above, a satisfactory image is not obtainable due to the thinning of a line.

In Japanese Unexamined Patent Publication No. 63(1988)-129318 there is disclosed an optical modulation element in which each of the apertures one-dimensionally arranged is trapezoidal in shape when projected onto a plane (xy-plane) perpendicular to an optical axis (z-axis). Generally, in the case where horizontal scanning is performed on photosensitive material in a direction perpendicular to an aperture array in order to form an image, unexposed blank portions will arise between apertures, if the shape of each aperture is constituted by a simple separate rectangle. Consequently, vertical line nonuniformity arises in the horizontal scanning direction of the image. To solve this problem, the aforementioned Japanese Unexamined Patent Publication No. 63(1988)129318 discloses that the apertures are formed into a trapezoid so that the light beams from the aperture overlap each other when the beams are scanned onto the photosensitive material in the horizontal scanning direction.

As described above, by forming the aperture into a trapezoid, an effect of improvement is expected with respect to the thinning of an image (line) that is the problem described in the aforementioned Japanese Unexamined Patent Publication No. 4(1992)-372927. On the other hand, in order to realize the aforementioned shape and arrangement of the apertures so that the secondary electro-optic effect of an electro-optic crystal such as PLZT ceramic is utilized, it is necessary to form the aperture shape in three dimensions. However, to realize the aperture shape by the end-face incidence type structure, there is a need to perform complicated machining, such as cutting of oblique aperture separating grooves into an electro-optic crystal. Such complicated machining is not realistic from an industrial standpoint.

Furthermore, Japanese Unexamined Patent Publication No. 58(1983)-117521 discloses an optical modulation element in which individual electrodes are arranged in two rows in zigzag fashion within a plane perpendicular to an optical axis. Individual electrodes are arranged in zigzag fashion so that each individual electrode constitutes a single aperture. Light beams from the apertures overlap each other on the photosensitive surface in the horizontal scanning direction. It has been described that the overlapping can prevent the vertical line nonuniformity which occurs when an image is formed on photosensitive material with a conventional modulation element in which apertures are arranged one-dimensionally.

However, even when apertures are arranged in zigzag fashion, a single individual electrode constitutes a single aperture as it does in the aforementioned conventional examples. For this reason, if a predetermined aperture is set to a light-transmitting state and if an aperture, which forms a pixel adjacent to the pixel formed on photosensitive material by the predetermined aperture, is set to a light cut-off state, then there is still a problem that the image line, formed on binary sensitive material by light emitted from the predetermined aperture, will become thin.

SUMMARY OF THE INVENTION

The present invention has been made in view of the problem in the aforementioned conventional optical modulation elements, i.e., the problem that the line width of an image that is formed on the sensitive material becomes considerably thin, particularly when binary sensitive material is exposed with an optical modulation element taking advantage of the secondary electro-optic effect of an electro-optic crystal.

Accordingly, it is an object of the present invention to provide an optical modulation element that does not make the width of an image (line) thin even when the image is formed on binary sensitive material with the modulation element.

Another object of the invention is to provide a drive method for an optical modulation element which does not make the width of an image (line) thin even when the image is formed on binary sensitive material with the modulation element.

To achieve the above-mentioned objects of the present invention and in accordance with one important aspect of the present invention, there is provided an optical modulation element which comprises an electro-optic crystal substrate including individual electrodes arrayed and formed one-dimensionally on one surface of the substrate and also including a common electrode formed on the other surface in opposition to the plurality of individual electrodes. Each portion of the electrode-optic crystal substrate, interposed between the common electrode and each the individual electrode, constitutes an aperture portion, the aperture portion being switched between a light-transmitting state and a light cut-off state by controlling voltage between the opposite electrodes. The light incident on the aperture portion in a direction perpendicular to the arrayed direction of the individual electrodes from one surface of the electro-optic crystal substrate is modulated. Each individual electrode is formed into a shape that partially shares adjacent individual electrodes with a region on the electro-optic crystal substrate in the arrayed direction of the individual electrodes which is occupied by each individual electrode.

Here, the aperture portion means a portion interposed between opposite electrodes. When this aperture portion is set to a light-transmitting state, the light transmittance in the aperture portion is not always uniform over the entire aperture portion and does not necessarily match with a light-transmitting region.

In a preferred form of the present invention, each individual electrode has a trapezoidal shape having two edges which cross the arrayed direction of the individual electrodes, at least one of the two edges having a predetermined angle relative to a traveling direction of the light. Also, the interval between adjacent individual electrodes is defined as $d<L\times\sin\theta$ where d is the interval between adjacent individual electrodes, L is the length of the one edge, and $\theta$ is the predetermined angle.

The aforementioned "trapezoidal shape" includes a rhomb and a parallelogram. The trapezoidal electrodes may be arranged in the same direction or arranged in a nested manner.

The aforementioned "interval between adjacent individual electrodes defined as $d<L\times\sin\theta$" means that adjacent electrodes across the interval d of the electrode have an overlapping (region-sharing) angle so that adjacent electrodes overlap at the interval d. Note that when the projected length of the length L of the aforementioned one edge onto the optical-axis direction is expressed in terms of L', the aforementioned $d<L\times\sin\theta$ has the same meaning as $d<L'\times\tan\theta$.

In the optical modulation element of the present invention, each of a plurality of individual electrodes arranged on one surface of the electro-optic crystal substrate is formed into a shape that partially shares a region in the arrayed direction of the individual electrodes with adjacent individual electrodes. With this arrangement, when each aperture is set to a light-transmitting state, a portion indicating a transmitted-light quantity greater than a power threshold value necessary for formation of an image onto predetermined-value sensitive material (e.g., binary sensitive material) widens, compared with a conventional optical modulation element having rectangular electrodes and the same aperture pitch. Therefore, if the optical modulation element of the present invention is employed in exposing binary sensitive material, the thinning of the line width of an image that is formed by light transmitted through each aperture is reduced, compared with the conventional optical modulation element having rectangular electrodes. As a result, a satisfactory image is obtainable.

In accordance with another important aspect of the present invention, there is provided an optical modulator which comprises: an optical modulation element including an electro-optic crystal substrate, the electro-optic crystal substrate having individual electrodes arrayed and formed one-dimensionally on one surface of the substrate and also having a common electrode formed on the other surface in opposition to the plurality of individual electrodes; a drive circuit for independently applying voltage across each of the individual electrodes; and control means for controlling the drive circuit. A portion of the electro-optic crystal substrate, interposed between two adjacent individual electrodes of the plurality of individual electrodes and the common electrode, constitutes an aperture portion, the aperture portion being switched between a light-transmitting state and a light cut-off state by controlling voltage between the two adjacent individual electrodes and the common electrode. The aforementioned plurality of individual electrodes are constituted by first, second, third, and fourth individual electrodes continuously arranged, a combination of the first and second individual electrodes forming the aperture portion, a combination of the second and third individual electrodes forming the aperture portion, a combination of the third and fourth individual electrodes forming the aperture portion, these three aperture portions being continuous. The control means controls voltage which is applied between the first and second individual electrodes and the common electrode so that a polarity of the voltage is opposite that of voltage which is applied between the third and fourth individual electrodes and the common electrode, when the three continuous aperture portions are simultaneously set to a light-transmitting state, a light cut-off state, and a light-transmitting state, respectively.

In a preferred form of the invention, the width of each individual electrode in the arrayed direction is 30%~70% of an array pitch of the individual electrodes.

In accordance with still another important aspect of the present invention, there is provided a method for driving an optical modulator, the optical modulator comprising: (1) an optical modulation element including an electro-optic crystal substrate, the electro-optic crystal substrate having individual electrodes arrayed and formed one-dimensionally on one surface of the substrate and also having a common electrode formed on the other surface in opposition to the plurality of individual electrodes; (2) a drive circuit for independently applying voltage across each of the individual electrodes; and (3) control means for controlling the drive circuit; wherein a portion of the electro-optic crystal substrate, interposed between two adjacent individual electrodes of the plurality of individual electrodes and the common electrode, constitutes an aperture portion, the aperture portion being switched between a light-transmitting state and a light cut-off state by controlling voltage between the two adjacent individual electrodes and the common electrode; wherein the plurality of individual electrodes are constituted by first, second, third, and fourth individual electrodes continuously arranged, a combination of the first and second individual electrodes forming the aperture portion, a combination of the second and third individual electrodes forming the aperture portion, a combination of the third and fourth individual electrodes forming the aperture portion, these three aperture portions being continuous; and wherein the control means controls voltage which is applied between the first and second individual electrodes and the common electrode so that a polarity of the voltage is opposite that of voltage which is applied between the third and fourth individual electrodes and the common electrode, when the three aperture portions are simultaneously set to a light-transmitting state, a light cut-off state, and a light-transmitting state, respectively.

In the optical modulator of the present invention, the optical modulation element is constructed so that a single aperture portion is formed by two adjacent individual electrodes of a plurality of individual electrodes arranged on one surface of the optical modulation element. With this arrangement, when each aperture is set to a light-transmitting state, a portion indicating a transmitted-light quantity greater than a power threshold value necessary for formation of an image onto predetermined-value sensitive material (e.g., binary sensitive material) widens, compared with a conventional optical modulation element having rectangular electrodes and the same aperture pitch. Therefore, if the optical modulation element of the present invention is employed in exposing binary sensitive material, the thinning of the line width of an image that is formed by light transmitted through each aperture is reduced, compared with the conventional optical modulation element in which an aperture portion is formed by a single electrode. As a result, a satisfactory image is obtainable. In addition, the control means controls voltage which is applied between the first and second individual electrodes and the common electrode so that a polarity of the voltage is opposite that of voltage which is applied between the third and fourth individual electrodes and the common electrode, when the three continuous aperture portions are simultaneously set to a light-transmitting state, a light cut-off state, and a light-transmitting state, respectively. Therefore, even when three continuous aperture portions are set in the above-mentioned manner, the light cut-off state of the aperture portion interposed the aperture portions in the light-transmitting states can be kept.

In the drive method for an optical modulator according to the present invention, the optical modulator is constructed of an electro-optic crystal substrate including individual electrodes arrayed and formed one-dimensionally on one surface of the substrate and also including a common electrode formed on the other surface in opposition to the plurality of individual electrodes, and a single aperture portion is formed by two adjacent individual electrodes. With this, when each aperture is set to a light-transmitting state, a portion indicating a transmitted-light quantity greater than a power threshold value necessary for formation of an image onto predetermined-value sensitive material (e.g., binary sensitive material) widens, compared with a conventional optical modulation element having rectangular electrodes and the same aperture pitch. Therefore, if the optical modulation element of the present invention is employed in exposing binary sensitive material, the thinning of the line width of an image that is formed by light transmitted through each aperture is reduced, compared with the conventional optical modulation element in which an aperture portion is formed by a single electrode. As a result, a satisfactory image is obtainable. In addition, for three continuous apertures formed by four continuous individual electrodes, voltage which is applied between the first and second individual electrodes and the common electrode is controlled so that a polarity of the voltage is opposite that of voltage which is applied between the third and fourth individual electrodes and the common electrode, when the three continuous aperture portions are simultaneously set to a light-transmitting state, a light cut-off state, and a light-transmitting state, respectively. Therefore, even when three continuous aperture portions are set in the above-mentioned manner, the light cut-off state of the aperture portion interposed the aperture portions in the light-transmitting states can be kept.

In accordance with a further important aspect of the present invention, there is provided an optical modulation element which comprises: an electro-optic crystal substrate including a plurality of individual electrodes arranged and formed in a predetermined direction on one surface of the substrate and also including a common electrode formed on the other surface in opposition to the plurality of individual electrodes; and a plurality of aperture portions which are switched between a light-transmitting state and a light cut-off state by controlling voltage between the opposite electrodes, light incident on the aperture portions being modulated. The aforementioned plurality of individual electrodes are constructed of a plurality of primary electrodes formed at equal pitches in the predetermined direction and a plurality of secondary electrodes formed at equal pitches in the predetermined direction so that the secondary electrodes are respectively located between the primary electrodes. The primary electrode and the secondary electrodes across the primary electrode constitute each of the aperture portions.

Here, the "formed at equal pitches in the predetermined direction" means that it will be sufficient if pitches on a predetermined axis in the predetermined direction equal each other. The pitches are not necessarily arranged one-dimensionally. The "secondary electrodes are respectively located between the primary electrodes" means that the position of the secondary electrode on a predetermined axis in the predetermined direction is between the primary electrode and the primary electrode. In this case, the secondary electrodes are not necessarily arranged one-dimensionally. Furthermore, the primary electrode and the secondary electrode may partially overlap each other at a position on the predetermined direction.

The aforementioned "width" means the length of each electrode in the predetermined direction. The aforementioned "secondary electrodes across the primary electrode" means two secondary electrodes that are formed across the primary electrode on the predetermined axis in the predetermined direction.

The "primary electrode and the secondary electrodes across the primary electrode constitute each of the aperture portions" means that a portion of the electro-optic substrate, interposed between a single primary electrode and two secondary electrodes, constitute an aperture portion.

In a preferred form of the present invention, the primary electrodes and the secondary electrodes are alternately formed in a single row in the predetermined direction. In another preferred form of the present invention, the primary electrodes are formed in a single row in the predetermined direction, and the secondary electrodes are formed in a single row in the predetermined direction at positions different from the primary electrodes in a direction perpendicular to the predetermined direction so that the secondary electrodes are located between the primary electrodes formed in a single row.

In the optical modulator of the present invention, a plurality of individual electrodes are constructed of primary electrodes and secondary electrodes arranged on one surface of the electro-optic crystal substrate in a predetermined direction. The primary electrode and the secondary electrodes across the primary electrode form a single aperture. With this arrangement, when each aperture is set to a light-transmitting state, a portion indicating a transmitted-light quantity greater than a power threshold value necessary for formation of an image onto predetermined-value sensitive material (e.g., binary sensitive material) widens, compared with a conventional optical modulation element having rectangular electrodes and the same aperture pitch. Therefore, if the optical modulation element of the present invention is employed in exposing binary sensitive material, the thinning of the line width of an image that is formed by light transmitted through each aperture is reduced, compared with the conventional optical modulation element in which an aperture portion is formed by a single electrode. As a result, a satisfactory image is obtainable.

BRIEF DESCRIPTION OF THE DRAWINGS

The above and other objects and advantages will become apparent from the following detailed description when read in conjunction with the accompanying drawings wherein:

FIG. 6A is a perspective view of the optical modulation element of the optical modulator according to the second embodiment of the present invention;

FIG. 6B is a top plan view of the optical modulation element of the optical modulator according to the second embodiment of the present invention;

FIG. 6C is a diagram showing the quantity of light transmitted through the optical modulation element of the optical modulator according to the second embodiment of the present invention;

FIG. 14A is a perspective view of a conventional end-face incidence type of optical modulation element;

FIG. 14B is a top plan view of the conventional optical modulation element; and

FIG. 14C is a diagram showing the quantity of light transmitted through the conventional optical modulation element.

DETAILED DESCRIPTION OF THE PREFERRED EMBODIMENTS

Figure 1:
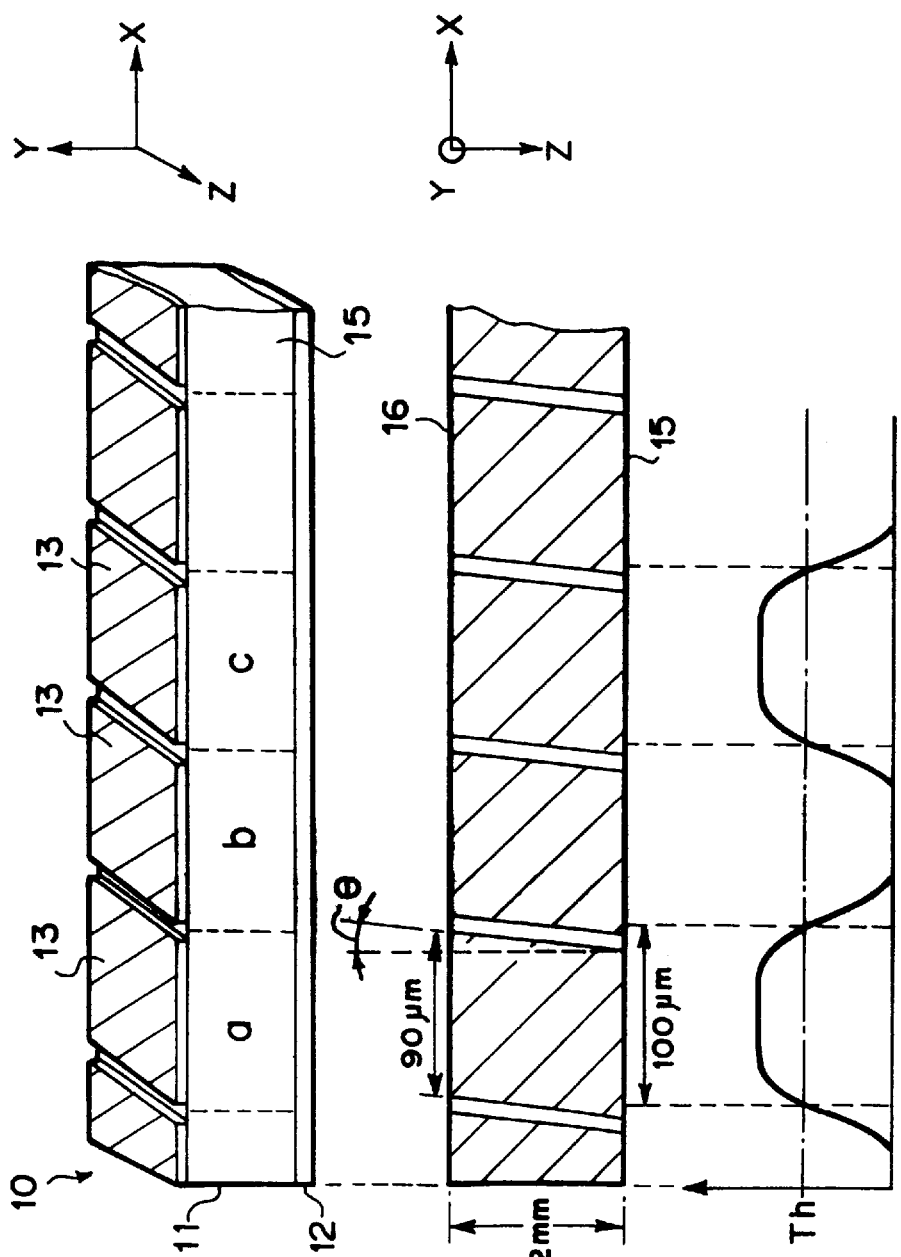
FIG. 1A is a perspective view of an optical modulation element according to a first embodiment of the present invention.
FIG. 1B is a top plan view of the optical modulation element according to the first embodiment of the present invention.
FIG. 1C is a diagram showing the quantity of light transmitted through the optical modulation element according to the first embodiment of the present invention.
Figure 2:
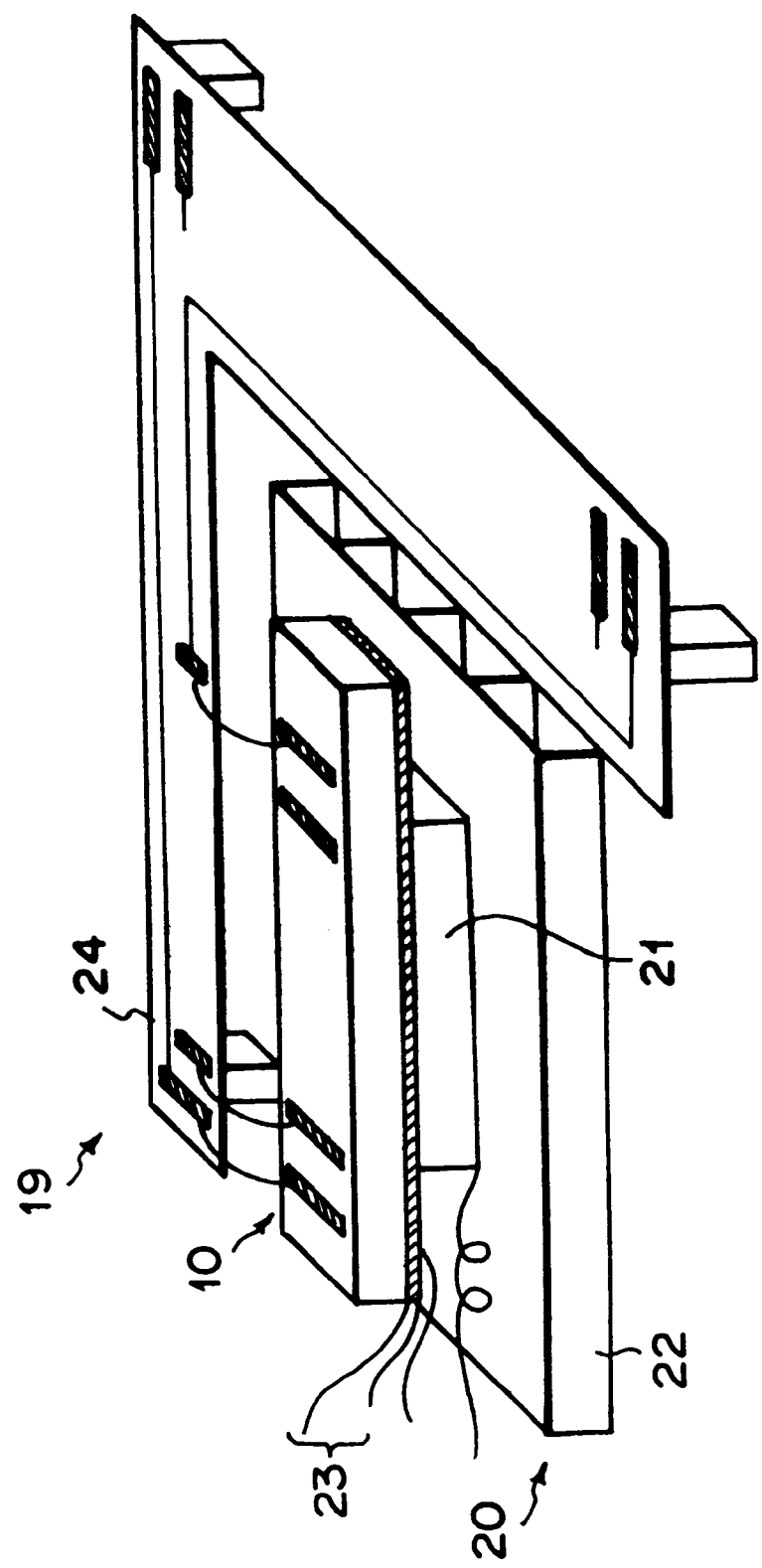
FIG. 2 is a perspective view of an optical modulator in which the optical modulation element of the first embodiment of the present invention is arranged in a control circuit.

Referring to FIGS. 1A through 1C, there is shown an optical modulation element 10 according to a first embodiment of the present invention. As shown in the figures, the optical modulation element 10 is constructed of an electro-optic crystal substrate 11, which consists of plomb lanthanum zirconate titanate (PLZT) ceramic, a common electrode 12 formed on the under surface of the electro-optic crystal substrate 11, and a plurality of individual electrodes 13 formed on the top surface of the electro-optic crystal substrate 11. As shown in FIG. 1B, the optical modulation element 10 of the first embodiment is characterized in that the edge of each individual electrode 13 that crosses the x-axis has a predetermined angle θ to the z-axis and that the individual electrode 13 is formed into a parallelogram. The optical modulation element 10 is arranged on a temperature-adjusting assembly 20, as shown in FIG. 2. The individual electrodes 13 are connected to a drive circuit (not shown). The temperature-adjusting assembly 20 is equipped with a thermo electronic element 21, a radiating fin 22, and a thermistor 23.

The structure of the optical modulation element 10 according to the first embodiment of the present invention will hereinafter be described along with a fabrication method thereof.

PLZT ceramic (($La_xPb_{1-x}$) ($Zr_yTi_{1-y}$)$_{1-x/4}O_3$) having a composition ratio of x/y/1−y=9/65/35 in the unit of % and also having an average grain size of 4 μm Φ is employed as an electro-optic medium. The base material of the element 10 is a wafer obtained by slicing PLZT ceramic at a thickness of 250 μm, and both sides of the wafer are slightly polished.

First, a Cr-Au laminated film is formed as the common electrode 12 on one surface of the above-mentioned wafer by vacuum deposition. At this time, let the thickness of the Cr film be 50 Å and the thickness of the Au film be 500 Å. Then, a group of individual electrodes are formed by a lift-off method on the other surface of the wafer opposite to the surface on which the common electrode 12 was formed. A photoresist is coated on the surface on which the individual electrodes 13 are formed. The photoresist is exposed with a photomask, which is provided with individual electrode patterns for forming individual electrodes and cutting mark patterns for cutting the wafer into individual elements. After exposure, development is performed, whereby patterns are formed in the photoresist. Thereafter, as with the formation of the common electrode, a Cr-Au electrode is formed by vacuum deposition. Finally, the wafer is immersed into acetone to solve the photoresist patterns, and the thin film of Cr-Au deposited on the photoresist patterns is lifted off, whereby desired electrode patterns (a plurality of individual electrodes 13) are obtained.

For the geometric dimensions of the optical modulation element 10 in the first embodiment, the aperture pitch is 100 μm, the individual electrodes are 80 μm in width (x-direction) and 2 mm in length (z-direction=optical axis direction). The edge of the individual electrode forms an angle of 1° with the optical axis (z-axis). The interval between electrodes (x-direction) is 10 μm. The ratio of (aperture pitch)/(PLZT plate thickness) is 1/2.5.

For the aforementioned angle θ between the optical axis and the edge of the individual electrode, adjacent individual electrodes share a portion of the region of the substrate in the x-direction. That is, this embodiment requires an angle such that a portion of the end of the individual electrode overlaps with the adjacent electrode. This embodiment requires an angle at which adjacent electrodes overlap each other at one point at least, as the lower limit value. For instance, in this embodiment, an angle of $\tan^{-1}$ (10 μm/2 mm)=0.3° is required. In addition, an overlapping quantity depends upon what sensitive material is recorded. Therefore, the upper limit value of the aforementioned angle varies with sensitive material to be recorded, but it is desirable that adjacent electrodes overlap at about ⅓ of the aperture pitch. For the optical modulation element of this embodiment having a length of 2 mm, the angle is between $\tan^{31\ 1}$ (60 μm/2 mm) and 2°.

Figure 3A:
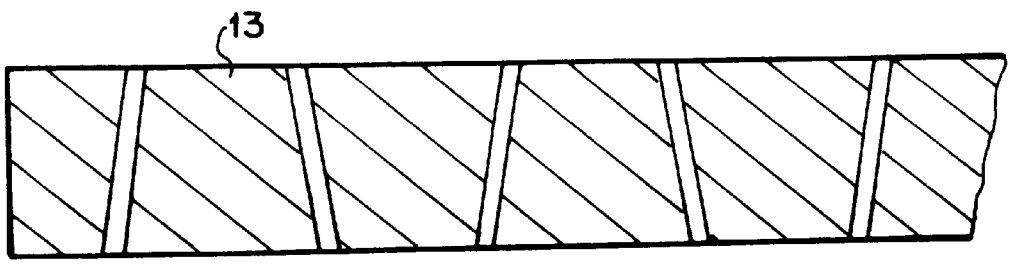
FIGS. 3A through 3C are sectional side views of various shapes of the optical modulation element according to the first embodiment of the present invention.
Figure 3B:
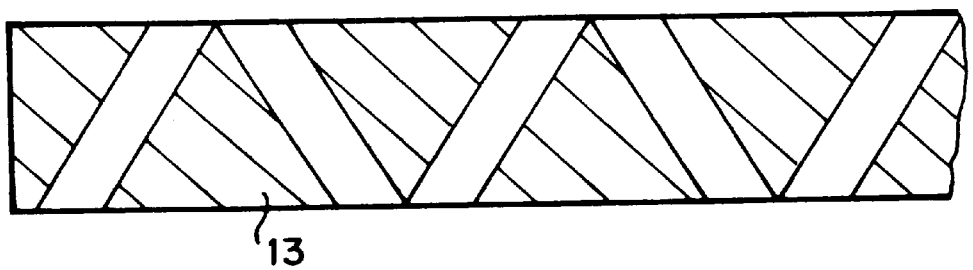
Figure 3C:
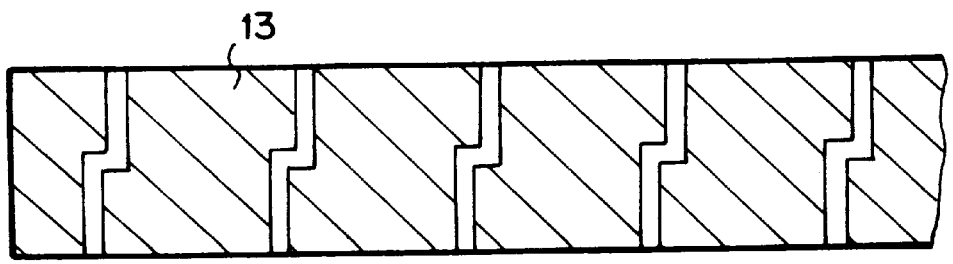

In the first embodiment, although the electrodes are formed in parallelograms, they may be formed into trapezoids with a similar angle and arranged in a nested manner, as shown in FIG. 3A. Note that the electrodes may be any other shapes if they overlap each other when viewed from the z-axis direction. For example, the electrodes may be triangle or polygonal in shape, as shown in FIGS. 3B and 3C.

Next, the wafer is cut into elements by a dicer. Each element has a width (x-direction) of 26 mm (=256 apertures) and a length (z-direction) of 2 mm.

The incident and exit end faces 15 and 16 of each cut element are optically polished. Then, nonreflective coating is performed on both end faces against the wavelength of light that is actually employed. In the first embodiment, the nonreflective coating employs a film of $SiO_2$, but may be constructed of other materials.

The surface of the processed element 10 on which the common electrode 12 was formed (the surface of the common electrode 12) is rigidly bonded to a base plate (not shown). The base plate also serves as the electric terminal of the common electrode, so it is desirable that the base plate have good conductivity and good thermal conductivity. In this embodiment, the material of the base plate is aluminum (Al), and the rigid bonding between the base plate and the element 10 is performed with a conductive adhesive (FIG. 1). Note that the rigid bonding may employ solder or the like instead of a conductive adhesive. The portion of this base plate near the electro-optic crystal substrate 11 is provided with a hole into which the thermistor 23 is inserted.

Finally, the individual electrodes 13 are connected by wire bonding to bonding pads 24 connected to the drive circuit (not shown).

Figure 4:
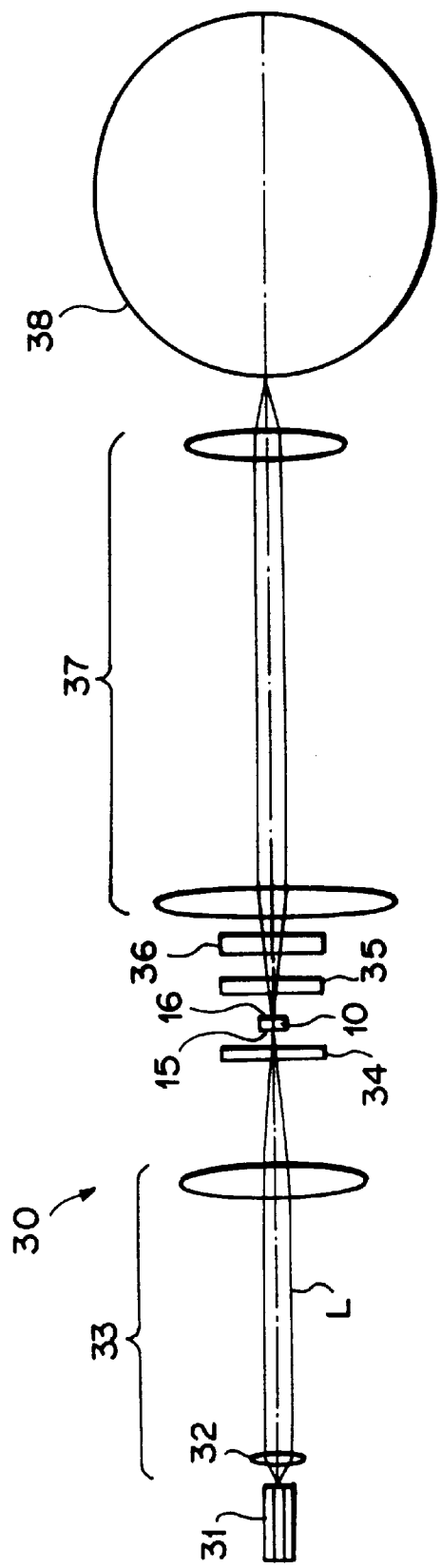
FIG. 4 is a side view of the optical system of a recorder equipped with the optical modulation element.

The optical modulation element 10, fabricated in the above-mentioned manner, is employed in an optical system 30 such as that shown in FIG. 4. FIG. 4 shows the optical system 30 of a recorder including the above-mentioned optical modulation element 10. Laser light L emitted from a laser light source 31 is formed into linear light by a lens group 33 including a cylindrical lens 32, the linear light being used for illuminating the entire of the optical modulation element 10. In the case where the formed light is insufficient in a degree of polarization, the light is passed through a polarizer (not shown in FIG. 4). Then, the polarization direction of the light is rotated at an angle of 45° to the x-axis by a first half-wave plate 34 and is incident on the optical modulation element 10. The polarization plane of the light incident on the optical modulation element 10 is rotated by the double refraction occurring in the electro-optic medium in correspondence to voltage applied to the individual electrodes 13 of the optical modulation element 10. The rotated light is transmitted through the optical modulation element 10.

In the first embodiment, a voltage of 80 V is applied between the electrodes (common electrode 12 and individual electrode 13) corresponding to the apertures that are set to light-transmitting states.

The polarization plane of the light, transmitted through the optical modulation element 10, is returned by 45° again with a second half-wave plate 35. Note that the second half-wave plate 35 is not necessarily required. In a polarizer 36 arranged to form a cross-Nicol prism in cooperation with the aforementioned polarizer (not shown), the modulation of the angle of the polarization plane is converted to light intensity change. Thereafter, an image-forming lens system 37 reduces the aperture image to a predetermined size and forms the reduced image onto the sensitive surface of a drum 38. In this embodiment the aperture pitch of the optical modulation element 10 is reduced from 100 μm to 30 μm.

FIG. 1C illustrates the profile example of transmitted light in the case where the continuous apertures a, b, and c are respectively set to a light transmitting state, a light cut-off state, and a light transmitting state. As illustrated in the figure, the light quantity, transmitted through the apertures a and c set to the light transmitting states, is approximately the same width as the aperture width and exceeds the threshold level Th of the sensitive material. Even when adjacent apertures are not continuously in light-transmitting states, the image line formed by the light emitted from each aperture is rarely made thin and a satisfactory image is obtainable even on binary sensitive material. More specifically, when the power threshold level Th at which an image can be formed onto the sensitive material is 80% of the peak power, the width of a line image is 1.00 times the aperture pitch.

Figure 5:
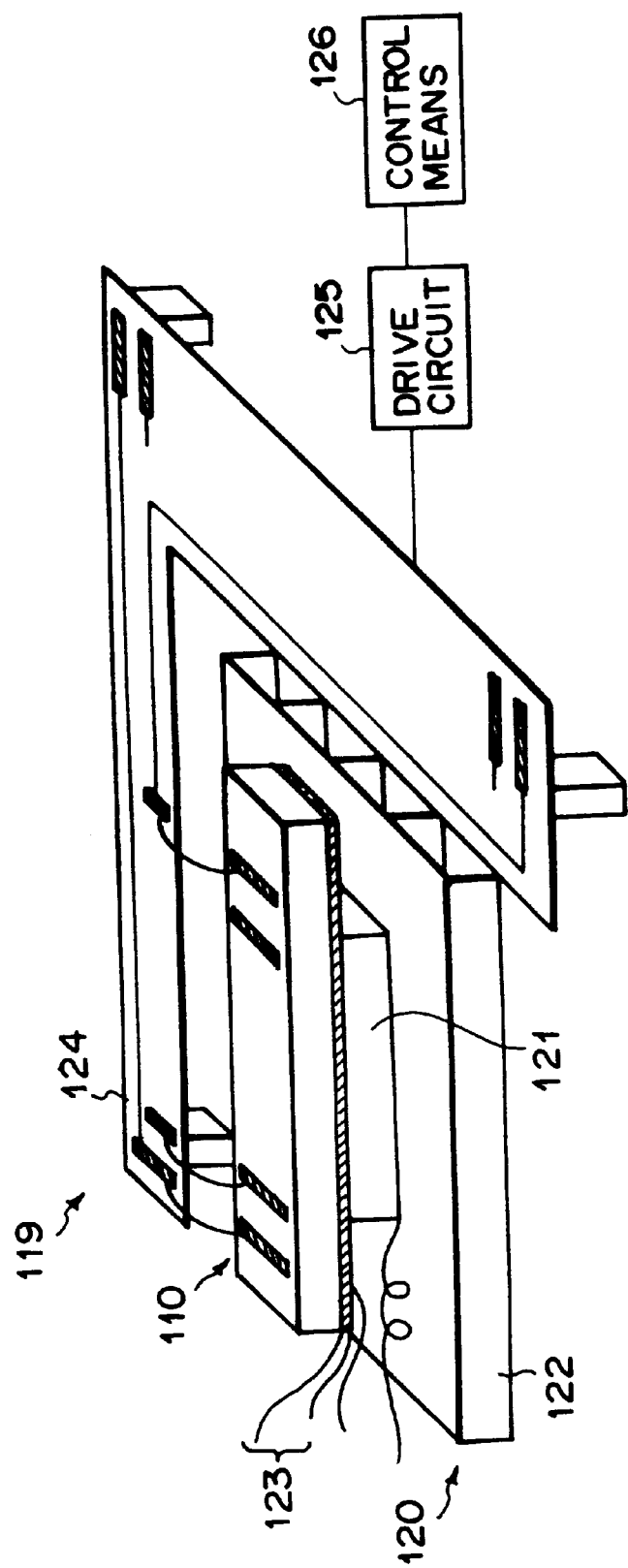
FIG. 5 is a perspective view of an optical modulator according to a second embodiment of the present invention.

FIG. 5 illustrates an optical modulator 119 constructed according to a second embodiment of the present invention. As illustrated in the figure, the optical modulator 119 is constructed of an optical modulation element 110, a temperature-adjusting assembly 120 on which the optical modulation element 110 is arranged, a drive circuit 125 to which the individual electrodes 113 of the optical modulation element 110 are connected, and control means 126 for controlling the drive circuit 125. The temperature-adjusting assembly 120 is equipped with a thermoelectronic element 121, a radiating fin 122, and a thermistor (lead wire of a thermistor) 123.

FIGS. 6A and 6B illustrate the optical modulation element 110 employed in the optical modulator 119 of the second embodiment. FIG. 6C illustrates the transmitted light profile of the optical modulation element 110.

The optical modulation element 110 of the second embodiment, as shown in FIG. 6A, is constructed of an electro-optic crystal substrate 111, which consists of PLZT ceramic, a common electrode 112 formed on the under surface of the electro-optic crystal substrate 111, and a plurality of individual electrodes 113 formed on the top surface of the electro-optic crystal substrate 111.

The structure of the optical modulation element 110 according to the second embodiment of the present invention will hereinafter be described along with a fabrication method thereof.

PLZT ceramic $((La_xPb_{1-x})(Zr_yTi_{1-y})_{1-x/4}O_3)$ having a composition ratio of x/y/1−y=9/65/35 in the unit of % and also having an average grain size of 4 μm Φ is employed as an electro-optic medium. The base material of the element 110 is a wafer obtained by slicing PLZT ceramic at a thickness of 250 μm, and both sides of the wafer are slightly polished.

First, a Cr-Au laminated film is formed as the common electrode 112 on one surface of the above-mentioned wafer by vacuum deposition. At this time, let the thickness of the Cr film be 50 Å and the thickness of the Au film be 500 Å. Then, a group of individual electrodes are formed by a lift-off method on the other surface of the wafer opposite to the surface on which the common electrode 112 was formed. A photoresist is coated on the surface on which the individual electrodes 113 are formed. The photoresist is exposed with a photomask, which is provided with individual electrode patterns for forming individual electrodes and cutting mark patterns for cutting the wafer into individual elements. After exposure, development is performed, whereby patterns are formed in the photoresist. Thereafter, as with the formation of the common electrode, a Cr-Au electrode is formed by vacuum deposition. Finally, the wafer is immersed into acetone to solve the photoresist patterns, and the thin film of Cr-Au deposited on the photoresist patterns is lifted off, whereby desired electrode patterns (a plurality of individual electrodes 113) are obtained.

An aperture is constituted by two adjacent individual electrodes 113 and the common electrode 112. In FIG. 6, the individual electrodes 113 consist of a first individual electrode I, a second individual electrode II, a third individual electrode III, and a fourth individual electrode IV. In the second embodiment, the individual electrodes I and II and the common electrode 112 constitute an apertures. Similarly, the individual electrodes II and III and the common electrode 112 constitute an aperture b. The individual electrodes III and IV and the common electrode 112 constitute an aperture c.

For the geometric dimensions of the optical modulation element 110 in the second embodiment, the aperture pitch is 100 μm, the individual electrodes are 80 μm in width (x-direction) and 2 mm in length (z-direction=optical axis direction). The interval between electrodes (x-direction) is 40 μm. The ratio of (aperture pitch)/(PLZT plate thickness) is 1/2.5.

The necessary overlapping quantity of the transmitted light quantity from each aperture varies, depending on what sensitive material is recorded. If the width of the electrode is wide with respect to the aperture pitch, the overlapping quantity will become too large and a problem. If it is too small, the light quantity in the central portion of the aperture will be reduced to less than a predetermined threshold value. This reduction is causative of line nonuniformity. In the second embodiment, although the width of the electrode is 60% of the aperture pitch, it is desirable that the width be in a range of 30~70%.

Next, the wafer is cut into elements by a dicer. Each element has a width (x-direction) of 26 mm (=256 apertures) and a length (z-direction) of 2 mm.

The incident and exit end faces 115 and 116 of each cut element are optically polished. Then, nonreflective coating is performed on both end faces against the wavelength of light that is actually employed. In the second embodiment, the nonreflective coating employs a film of $SiO_2$, but may be constructed of other materials.

The surface of the processed element 110 on which the common electrode 112 was formed (the surface of the common electrode 112) is rigidly bonded to a base plate (not shown) attached to the temperature-adjusting assembly 120. The base plate also serves as the electric terminal of the common electrode, so it is desirable that the base plate have good conductivity and good thermal conductivity. In the second embodiment, the material of the base plate is aluminum (Al), and the rigid bonding between the base plate and the element 110 is performed with a conductive adhesive (FIG. 5). Note that the rigid bonding may employ solder or the like instead of a conductive adhesive. The portion of this base plate near the electro-optic crystal substrate 111 is provided with a hole into which the thermistor 123 is inserted.

Finally, the individual electrodes 113 are connected by wire bonding to bonding pads 124 connected to the drive circuit 125.

Figure 7:
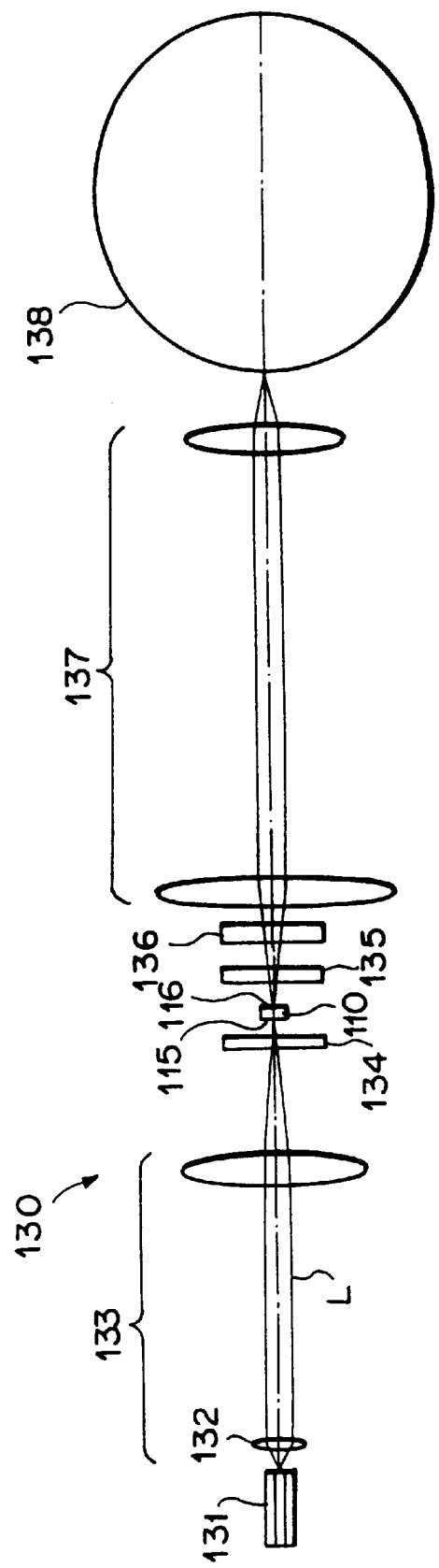
FIG. 7 is a side view of the optical system of a recorder equipped with the optical modulation element according to the second embodiment of the present invention.
Figure 8:
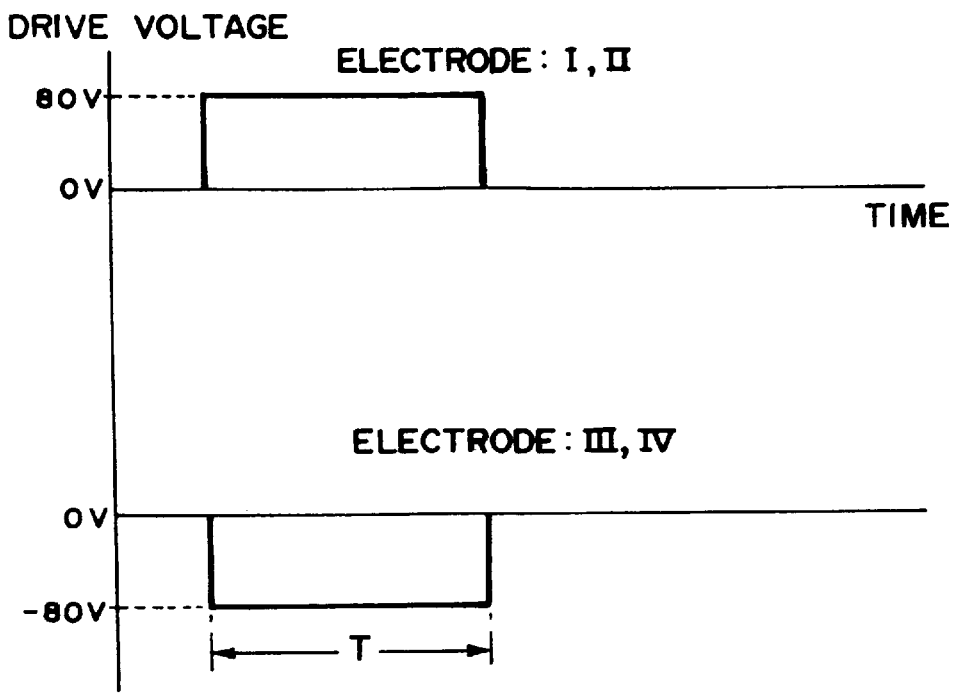
FIG. 8 is a waveform diagram of drive voltage used to set apertures a and c to light-transmitting states.

The optical modulator 119, including the optical modulation element 110 fabricated in the above-mentioned manner, is employed in an optical system 130 such as that shown in FIG. 7. FIG. 7 shows the optical system 130 of a recorder equipped with the above-mentioned optical modulator 119. Laser light L emitted from a laser light source 131 is formed into linear light by a lens group 133 including a cylindrical lens 132, the linear light being used for illuminating the entire of the optical modulation element 110. In the case where the formed light is insufficient in a degree of polarization, the light is passed through a polarizer (not shown in FIG. 7). Then, the polarization direction of the light is rotated at an angle of 45° to the x-axis by a first half-wave plate 134 and is incident on the optical modulation element 110. The polarization plane of the light incident on the optical modulation element 110 is rotated by the double refraction occurring in the electro-optic medium in correspondence to voltage applied to the individual electrodes 113 of the optical modulation element 110. The rotated light is transmitted through the optical modulation element 110.

In the second embodiment, a voltage of 80 V is applied between the electrodes (common electrode 112 and individual electrode 113) corresponding to the apertures through which light is transmitted.

The polarization plane of the light, transmitted through the optical modulation element 110, is returned by 45° again with a second half-wave plate 135. Note that the second half-wave plate 135 is not necessarily required. In a polarizer 136 arranged to form a cross-Nicol prism in cooperation with the aforementioned polarizer (not shown), the modulation of the angle of the polarization plane is converted to light intensity change. Thereafter, an image-forming lens system 137 reduces the aperture image to a predetermined size and forms the reduced image onto the sensitive surface of a drum 138. In the second embodiment the aperture pitch of the optical modulation element 110 is reduced from 100 μm to 30 μm.

A drive method for setting the continuous apertures a, b, and c of the optical modulation element 110 to a light transmitting state, a light cut-off state, and a light transmitting state with the optical modulator 119 of the second embodiment will be executed as follows.

To set the apertures a, b, and c as described above, a voltage of +80 V is applied between the electrodes (I and II) and the common electrode 112 only for time T during which the aperture a is in the light-transmitting state. A voltage of −80 V is applied between the electrodes (III and IV) and the common electrode 112 to set the aperture c to the light-transmitting state.

Figure 9:
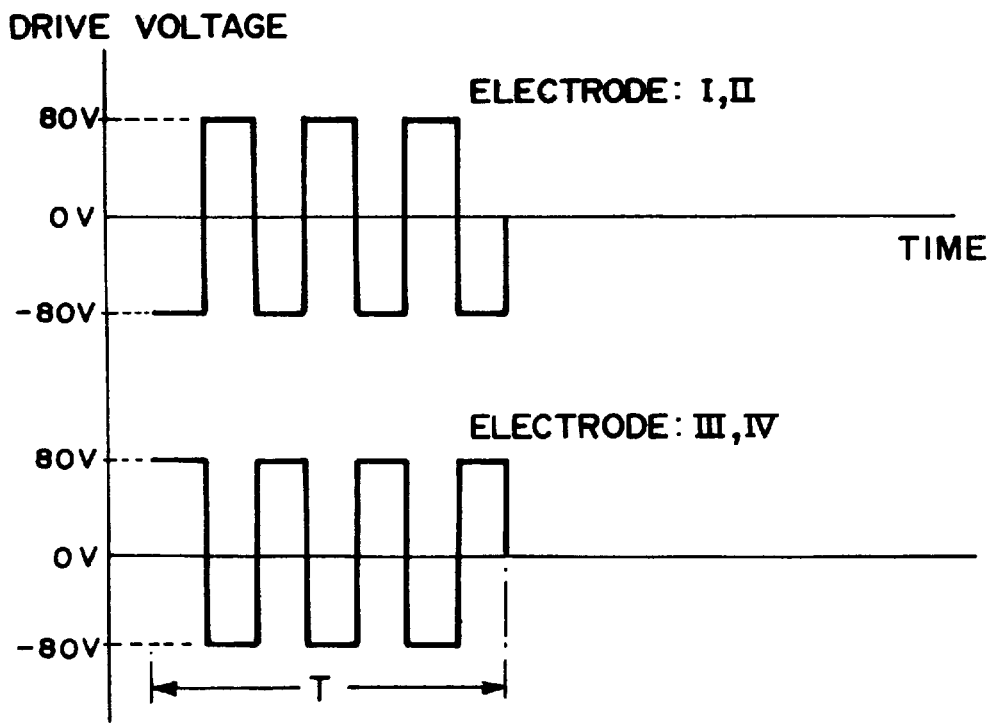
FIG. 9 is a wave form diagram of drive voltage used for setting apertures a and c to light-transmitting states.

In addition, an alternating voltage of 80 V may be employed only for time T during which a light-transmitting state is desired, as shown in FIG. 9. This method is often employed in order to prevent a reduction in an effective applied voltage, i.e., DC drift, the DC drift being generated due to the electric charge inclination in an electro-optic medium that occurs when only voltage with one polarity is applied for hours. To obtain the advantages of the present invention when alternating voltage is employed, the voltage waveform between the electrodes (I and II) and the common electrode 112 and the voltage waveform between the electrodes (III and IV) and the common electrode 112 are driven with opposite phases so that opposite polarities are always obtained at arbitrary time.

FIG. 6C illustrates the profile example of transmitted light in the case where the continuous apertures a, b, and c are respectively set to a light transmitting state, a light cut-off state, and a light transmitting state. As illustrated in the figure, the light quantity, transmitted through the apertures a and c set to the light transmitting states, is approximately the same width as the aperture width and exceeds the threshold level Th of the sensitive material. Even when adjacent apertures are not continuously set to light-transmitting states, the image line formed by the light emitted from each aperture is rarely made thin. More specifically, when the power threshold level Th at which an image can be formed onto the sensitive material is 80% of the peak power, the width of a line image is 1.2 times the aperture pitch.

Figures 10A, 10B, 10C:
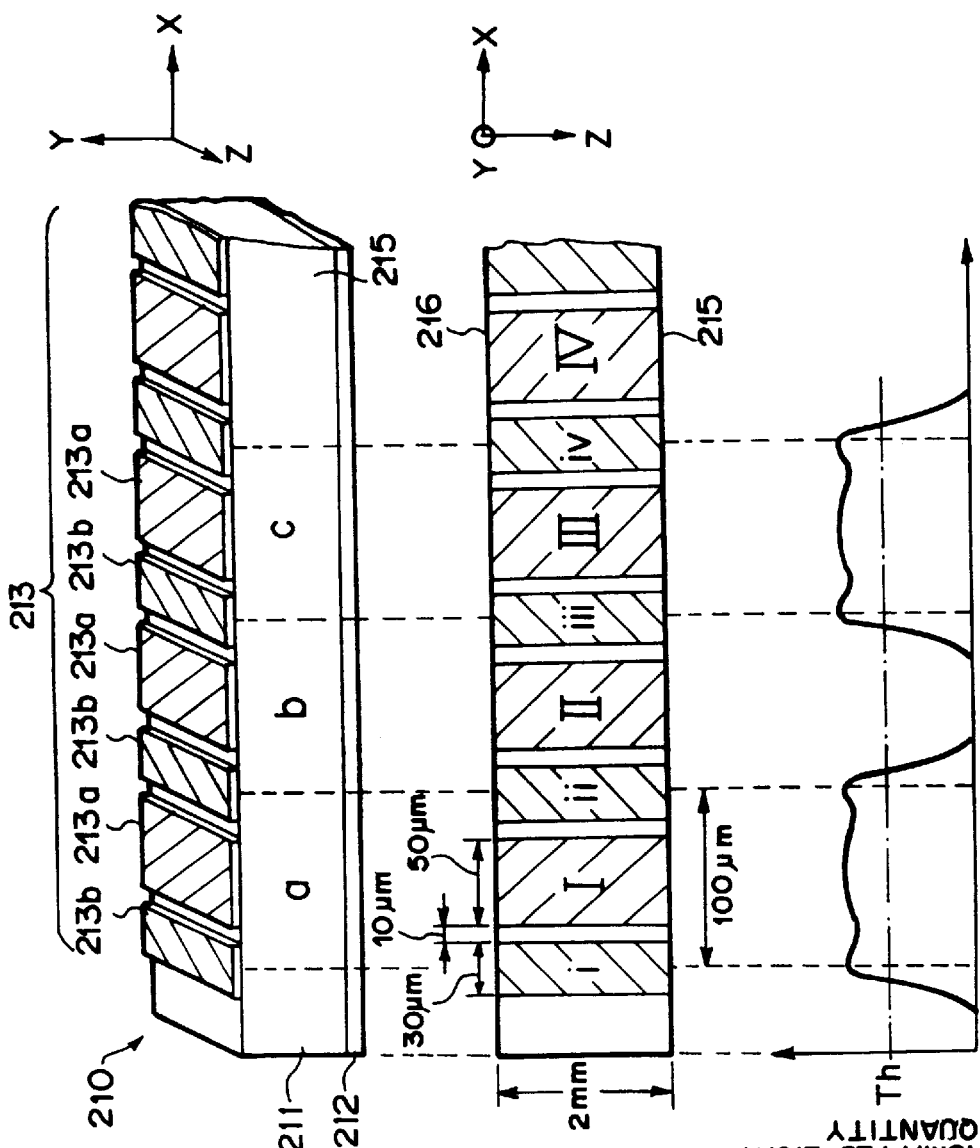
FIG. 10A is a perspective view of an optical modulation element according to a third embodiment of the present invention.
FIG. 10B is a top plan view of the optical modulation element according to the third embodiment of the present invention.
FIG. 10C is a diagram showing the quantity of light transmitted through the optical modulation element according to the third embodiment of the present invention.
Figure 11:
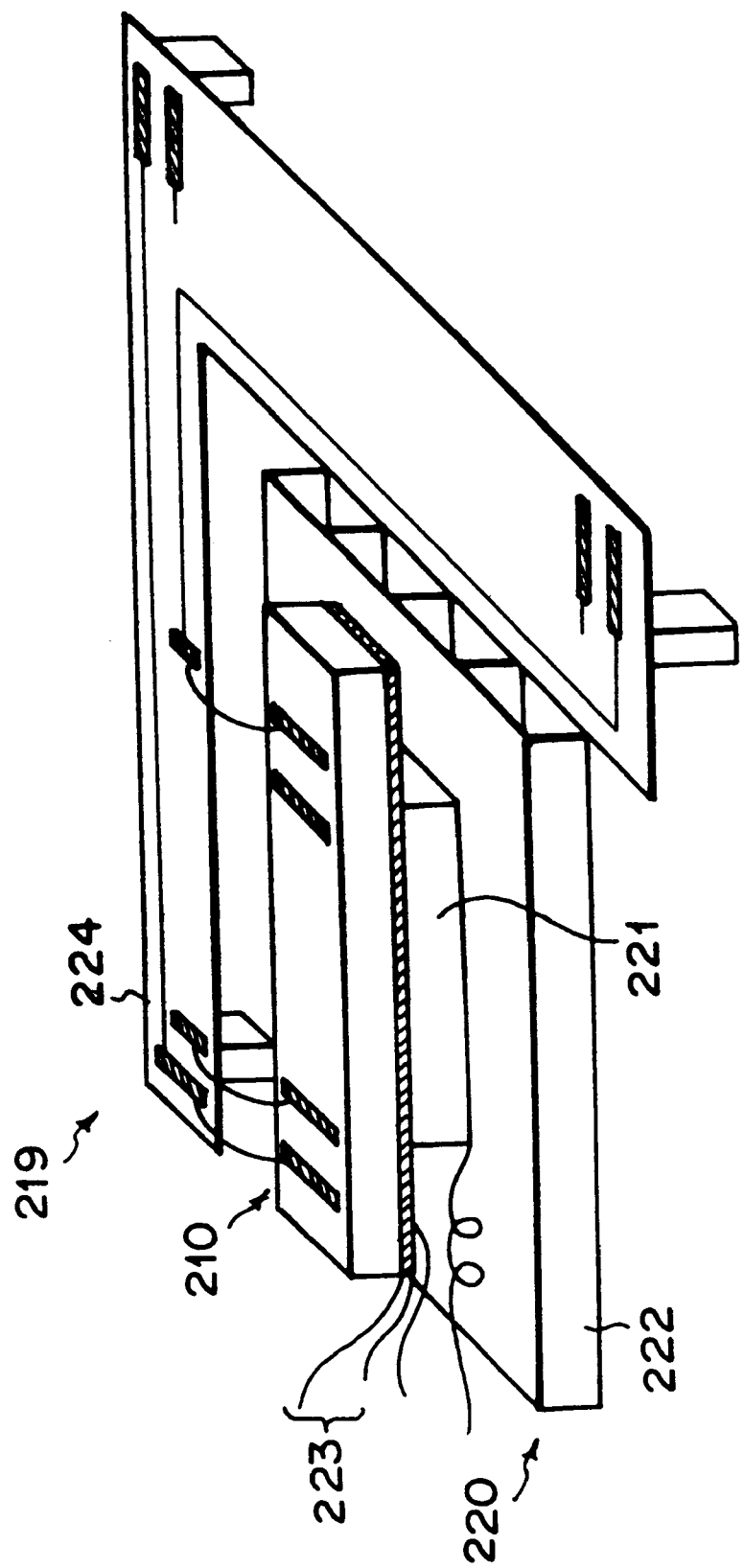
FIG. 11 is a perspective view of an optical modulator in which the optical modulation element of the third embodiment of the present invention is arranged in a control circuit.

FIGS. 10A through 10C show an optical modulation element 210 constructed according to a third embodiment of the present invention. As shown in the figures, the optical modulation element 210 is constructed of an electro-optic crystal substrate 211, which consists of PLZT ceramic, a common electrode 212 formed on the under surface of the electro-optic crystal substrate 211, and a plurality of individual electrodes 213 formed on the top surface of the electro-optic crystal substrate 211. As shown in FIG. 10B, the optical modulation element 10 of the third embodiment is characterized in that the individual electrodes 213 are constructed of primary electrodes 213a and second electrodes 213b alternately arranged in a single row. The width of the secondary electrode 213b is thinner than that of the primary electrode 213a. The optical modulation element 210 of the third embodiment is arranged on a temperature-adjusting assembly 220, as shown in FIG. 11. The individual electrodes 213 are connected to a drive circuit (not shown). The temperature-adjusting assembly 220 is equipped with a thermoelectronic element 221, a radiating fin 222, and a thermistor (lead wire of a thermistor) 223.

The structure of the optical modulation element 210 according to the third embodiment of the present invention will hereinafter be described along with a fabrication method thereof.

PLZT ceramic $((La_xPb_{1-x})(Zr_yTi_{1-y})_{1-x/4}O_3)$ having a composition ratio of x/y/1−y=9/65/35 in the unit of % and also having an average grain size of 4 μm Φ is employed as an electro-optic medium. The base material of the element 210 is a wafer obtained by slicing PLZT ceramic at a thickness of 250 μm, and both sides of the wafer are slightly polished.

First, a Cr-Au laminated film is formed as the common electrode 212 on one surface of the above-mentioned wafer by vacuum deposition. At this time, let the thickness of the Cr film be 50 Å and the thickness of the Au film be 500 Å. Then, a group of individual electrodes are formed by a lift-off method on the other surface of the wafer opposite to the surface on which the common electrode 212 was formed. A photoresist is coated on the surface on which the individual electrodes 213 are formed. The photoresist is exposed with a photomask, which is provided with individual electrode patterns for forming individual electrodes and cutting mark patterns for cutting the wafer into individual elements. After exposure, development is performed, whereby patterns are formed in the photoresist. Thereafter, as with the formation of the common electrode, a Cr-Au electrode is formed by vacuum deposition. Finally, the wafer is immersed into acetone to solve the photoresist patterns, and the thin film of Cr-Au deposited on the photoresist patterns is lifted off, whereby desired electrode patterns (a group of individual electrodes 213 (213a and 213b)) are obtained.

An aperture is constituted by a single primary electrode 213a, the secondary electrodes 213b across the primary electrode 213a, and the common electrode 212. The secondary electrode 213b, arranged between the primary electrodes 213a, is chiefly employed in the control of adjacent apertures constituted by the primary electrodes 213a. In FIG. 10, the primary electrodes 213a consist of electrodes I, II, III, and IV. The secondary electrodes 213b consist of electrodes i, ii, iii, and iv. In the third embodiment, the primary electrode I, the secondary electrodes i and ii, and the common electrode 212 constitute an aperture a. Similarly, the primary electrode II, the secondary electrodes ii and iii, and the common electrode 212 constitute an aperture b. Furthermore, the primary electrode III, the secondary electrodes iii and iv, and the common electrode 212 constitute an aperture c.

For the geometric dimensions of the optical modulation element 210 in the third embodiment, the aperture pitch is φμm. The primary electrode has a width (x-direction) of 50 μm and a length (z-direction=optical axis direction) of 2 mm, while the secondary electrode has a width (x-direction) of 30 μm and a length (z-direction=optical axis direction) of 2 mm. The interval between the primary and secondary electrodes (x-direction) is 10 μm. The ratio of (aperture pitch)/(PLZT plate thickness) is 1/2.5. Note that the geometric dimensions of the element are not limited to this.

Next, the wafer is cut into elements by a dicer. Each element has a width (x-direction) of 26 mm (=256 apertures) and a length (z-direction) of 2 mm.

The incident and exit end faces 215 and 216 of each cut element are optically polished. Then, nonreflective coating is performed on both end faces against the wavelength of light that is actually employed. In the third embodiment, the nonreflective coating employs a film of $SiO_2$, but may be constructed of other materials.

The surface of the processed element 210 on which the common electrode 212 was formed (the surface of the common electrode 212) is rigidly bonded to a base plate (not shown) attached to the temperature-adjusting assembly 220. The base plate also serves as the electric terminal of the common electrode, so it is desirable that the base plate have good conductivity and good thermal conductivity. In the third embodiment, the material of the base plate is aluminum (Al), and the rigid bonding between the base plate and the element 210 is performed with a conductive adhesive (FIG. 10). Note that the rigid bonding may employ solder or the like instead of a conductive adhesive. The portion of this base plate near the electro-optic crystal substrate 211 is provided with a hole into which the thermistor 223 is inserted.

Finally, the individual electrodes 213 are connected by wire bonding to bonding pads 224 connected to the drive circuit 225.

Figure 12:
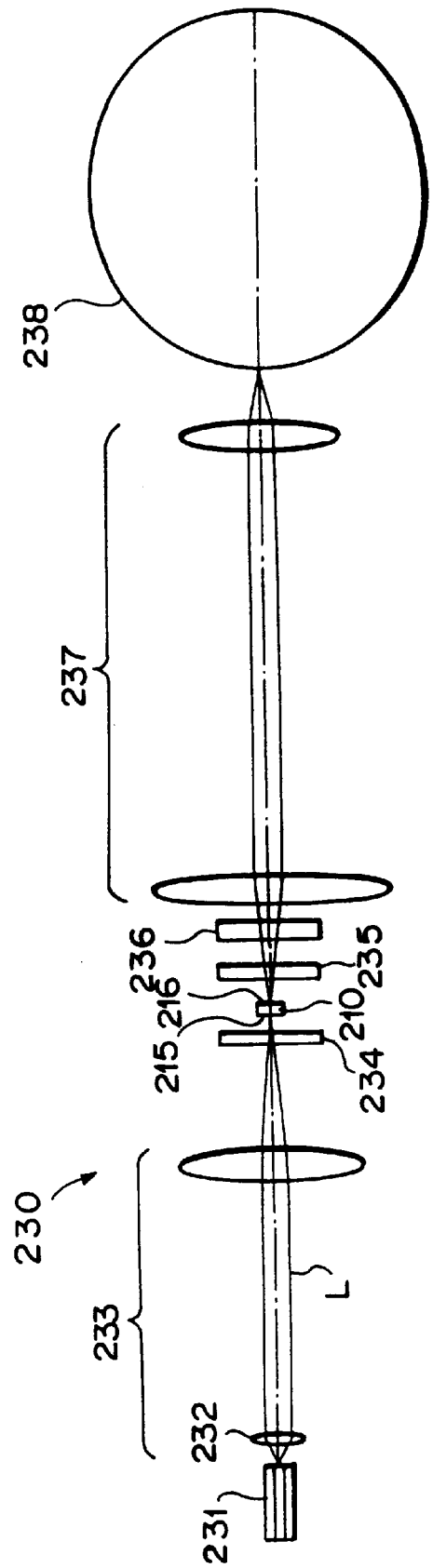
FIG. 12 is a side view of the optical system of a recorder equipped with the optical modulation element of the third embodiment of the present invention.

The optical modulator 219, including the optical modulation element 210 fabricated in the above-mentioned manner, is employed in an optical system 230 such as that shown in FIG. 12. FIG. 12 shows the optical system 230 of a recorder equipped with the above-mentioned optical modulator 219. Laser light L emitted from a laser light source 231 is formed into linear light by a lens group 233 including a cylindrical lens 232, the linear light being used for illuminating the entire of the optical modulation element 210. In the case where the formed light is insufficient in a degree of polarization, the light is passed through a polarizer (not shown in FIG. 10). Then, the polarization direction of the light is rotated at an angle of 45° to the x-axis by a first half-wave plate 234 and is incident ontheoptical modulation element 210. The polarization plane of the light incident on the optical modulation element 210 is rotated by the double refraction occurring in the electro-optic medium in correspondence to voltage applied to the individual electrodes 213 of the optical modulation element 210. The rotated light is transmitted through the optical modulation element 210.

In the third embodiment, a voltage of 80 V is applied between the electrodes (common electrode 212 and individual electrode 213) corresponding to the apertures through which light is transmitted.

The polarization plane of the light, transmitted through the optical modulation element 210, is returned by 45° again with a second half-wave plate 235. Note that the second half-wave plate 235 is not necessarily required. In a polarizer 236 arranged to form a cross-Nicol prism in cooperation with the aforementioned polarizer (not shown), the modulation of the angle of the polarization plane is converted to light intensity change. Thereafter, an image-forming lens system 237 reduces the aperture image to a predetermined size and forms the reduced image onto the sensitive surface of a drum 238. In the third embodiment the aperture pitch of the optical modulation element 210 is reduced from 100 μm to 30 μm.

When the continuous apertures a, b, and c of the optical modulation element 210 are respectively set to a light transmitting state, a light cut-off state, and a light transmitting state, a voltage of 80 V is applied between the electrodes (primary and secondary electrodes) and common electrode which constitute the apertures a and c. More particularly, to set the aperture a to the light-transmitting state, a voltage of 80 V is applied between the electrodes (primary electrode I and secondary electrodes i and ii) and the common electrode 212. At the same time, to set the aperture c to the light-transmitting state, a voltage of 80 V is applied between the electrodes (primary electrode III and secondary electrodes iii and iv) and the common electrode 212. When it is desirable to more finely control the shape of transmitted light, different voltages may be applied across the primary electrode and across the secondary electrode. Here, optical modulation chiefly means that the aperture is switched between a light-transmitting state and a light cut-off state by turning on and off voltage.

FIG. 10C illustrates the profile example of transmitted light in the case where the continuous apertures a, b, and c are respectively set to a light transmitting state, a light cut-off state, and a light transmitting state. As illustrated in the figure, the light quantity, transmitted through the apertures a and c set to the light transmitting states, is approximately the same width as the aperture width and exceeds the threshold level Th of the sensitive material. Even when adjacent apertures are not continuously set to light-transmitting states, the image line formed by the light emitted from each aperture is rarely made thin. More specifically, when the power threshold level Th at which an image can be formed onto the sensitive material is 80% of the peak power, the width of a line image is 1.1 times the aperture pitch.

Figure 13A:
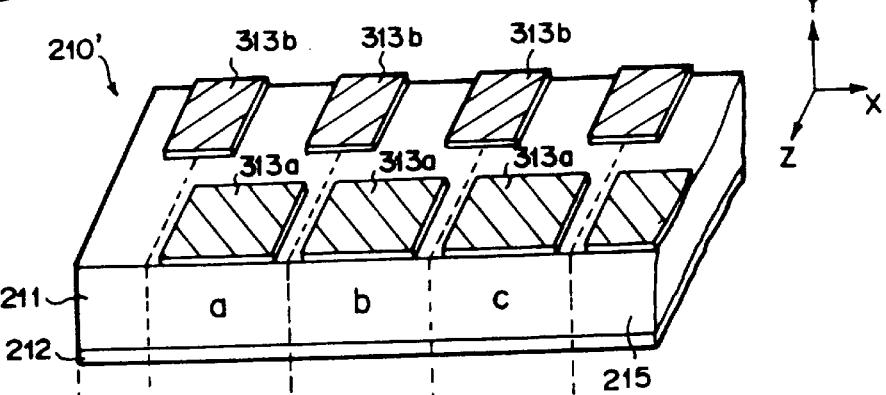
FIG. 13A is a perspective view of an optical modulation element according to a fourth embodiment of the present invention.
Figure 13B:
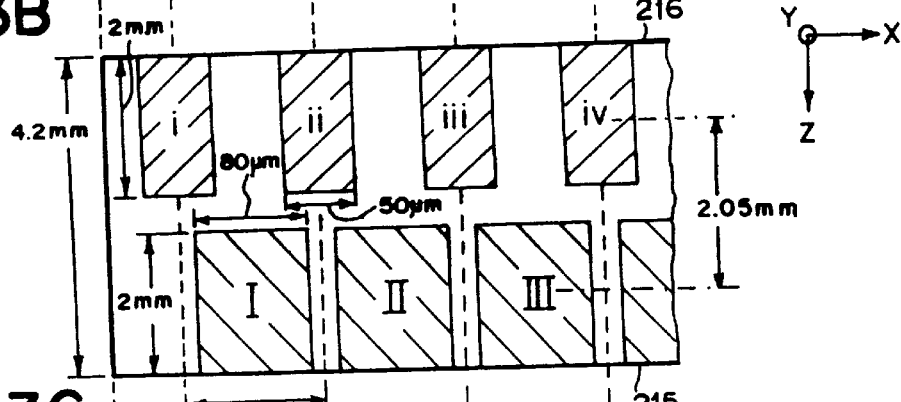
FIG. 13B is a top plan view of the optical modulation element according to the fourth embodiment of the present invention.
Figure 13C:
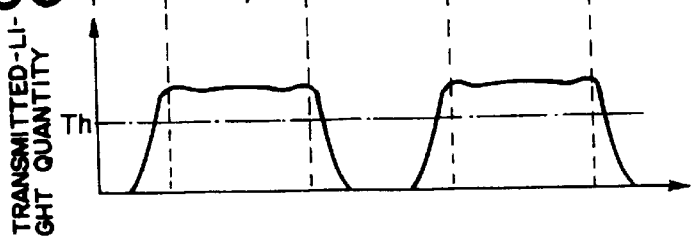
FIG. 13C is a diagram showing the quantity of light transmitted through the optical modulation element according to the fourth embodiment of the present invention.

FIGS. 13A through 13C illustrate an optical modulation element 210' constructed according to a fourth embodiment of the present invention.

As illustrated in the figures, the optical modulation element 210' is characterized in that primary and secondary electrodes 313a and 313b are arrayed in zigzag fashion. The same reference numerals will be applied to the same parts as the aforementioned optical modulation element 210 and therefore a detailed description thereof will not be given.

In the optical modulation element 210' of the fourth embodiment, the aperture pitch is 100 μm. The primary electrode has a width (x-direction) of 80 μm and a length (z-direction=optical axis direction) of 2 mm, while the secondary electrode has a width (x-direction) of 50 μm and a length (z-direction=optical axis direction) of 2 mm. The center interval between the primary and secondary electrodes (z-direction) is 2.05 mm. The ratio of (aperture pitch)/(PLZT plate thickness) is 1/2.5. The optical modulation element 210' has a width of 26 mm and a length (z-direction) of 4.2 mm.

When the continuous apertures a, b, and c of the optical modulation element 210' are respectively set to a light transmitting state, a light cut-off state, and a light transmitting state, a voltage of 80 V is applied between the electrodes (primary and secondary electrodes) and common electrode which constitute the apertures a and c. More particularly, to set the aperture a to the light-transmitting state, a voltage of 80 V is applied between the electrodes (primary electrode I and secondary electrodes i and ii) and the common electrode 212. Also, to set the aperture c to the light-transmitting state, a voltage of 80 V is applied between the electrodes (primary electrode III and secondary electrodes iii and iv) and the common electrode 212.

FIG. 13C illustrates the profile example of transmitted light in the case where the continuous apertures a, b, and c are respectively set to a light transmitting state, a light cut-off state, and a light transmitting state. As illustrated in the figure, the light quantity, transmitted through the apertures a and c set to the light transmitting states, is approximately the same width as the aperture width and exceeds the threshold level Th of the sensitive material. Even when adjacent apertures are not continuously set to light-transmitting states, the image line formed by the light emitted from each aperture is rarely made thin. More specifically, when the power threshold level Th at which an image can be formed onto the sensitive material is 80% of the peak power, the width of a line image is 1.1 times the aperture pitch.

In the above-mentioned fourth embodiment, although the primary electrodes 313a and the secondary electrodes 313b are arranged in two rows in zigzag fashion, the present invention is not limited to two rows. For example, primary electrodes and/or secondary electrodes may be arranged in a plurality of rows so that the entire electrodes are arranged in a plurality of rows in zigzag

What is claimed is:

1. An optical modulation element comprising:
   an electro-optic crystal substrate including individual electrodes arrayed and formed one-dimensionally on one surface of the substrate and also including a common electrode formed on the other surface in opposition to said plurality of individual electrodes;
   wherein each portion of said electrode-optic crystal substrate, interposed between said common electrode and each said individual electrode, constitutes an aperture portion, the aperture portion being switched between a light-transmitting state and a light cut-off state by controlling voltage between said opposite electrodes, and light incident on said aperture portion in a direction perpendicular to the arrayed direction of said individual electrodes from one surface of said electro-optic crystal substrate being modulated; and
   wherein each said individual electrode is formed into a shape which partially shares adjacent individual electrodes with a region on said electro-optic crystal substrate in the arrayed direction of said individual electrodes which is occupied by each said individual electrode.

2. The optical modulation element as set forth in claim 1, wherein
   each said individual electrode has a trapezoidal shape having two edges which cross the arrayed direction of said individual electrodes, at least one of said two edges having a predetermined angle relative to a traveling direction of said light; and
   an interval between adjacent individual electrodes is defined as $$d < L \times \sin\theta$$

where d is the interval between adjacent individual electrodes, L is the length of said one edge, and $\theta$ is the predetermined angle.

3. An optical modulator comprising:
   an optical modulation element including an electro-optic crystal substrate, the electro-optic crystal substrate having individual electrodes arrayed and formed one-dimensionally on one surface of the substrate and also having a common electrode formed on the other surface in opposition to said plurality of individual electrodes;
   a drive circuit for independently applying voltage across each of said individual electrodes; and
   control means for controlling said drive circuit;
   wherein a portion of said electro-optic crystal substrate, interposed between two adjacent individual electrodes of said plurality of individual electrodes and said common electrode, constitutes an aperture portion, the aperture portion being switched between a light-transmitting state and a light cut-off state by controlling voltage between said two adjacent individual electrodes and said common electrode;
   wherein said plurality of individual electrodes are constituted by first, second, third, and fourth individual electrodes continuously arranged, a combination of said first and second individual electrodes forming said aperture portion, a combination of said second and third individual electrodes forming said aperture portion, a combination of said third and fourth individual electrodes forming said aperture portion, these three aperture portions being continuous; and
   wherein said control means controls voltage which is applied between said first and second individual electrodes and said common electrode so that a polarity of said voltage is opposite that of voltage which is applied between said third and fourth individual electrodes and said common electrode, when said three continuous aperture portions are simultaneously set to a light-transmitting state, a light cut-off state, and a light-transmitting state, respectively.

4. The optical modulator as set forth in claim 3, wherein a width of each said individual electrode in said arrayed direction is 30%–70% of an array pitch of said individual electrodes.

5. A method for driving an optical modulator, said optical modulator comprising:
   an optical modulation element including an electro-optic crystal substrate, the electro-optic crystal substrate having individual electrodes arrayed and formed one-dimensionally on one surface of the substrate and also having a common electrode formed on the other surface in opposition to said plurality of individual electrodes;
   a drive circuit for independently applying voltage across each of said individual electrodes; and
   control means for controlling said drive circuit;
   wherein a portion of said electro-optic crystal substrate, interposed between two adjacent individual electrodes of said plurality of individual electrodes and said common electrode, constitutes an aperture portion, the aperture portion being switched between a light-transmitting state and a light cut-off state by controlling voltage between said two adjacent individual electrodes and said common electrode;
   wherein said plurality of individual electrodes are constituted by first, second, third and fourth individual electrodes continuously arranged, a combination of said first and second individual electrodes forming said aperture portion, a combination of said second and third individual electrodes forming said aperture portion, a combination of said third and fourth individual electrodes forming said aperture portion, these three aperture portions being continuous; and wherein said control means controls voltage which is applied between said first and second individual electrodes and said common electrode so that a polarity of said voltage is opposite that of voltage which is applied between said third and fourth individual electrodes and said common electrode, when said three aperture portions are simultaneously set to a light-transmitting state, a light cut-off state, and a light-transmitting state respectively.

6. An optical modulation element comprising:

an electro-optic crystal substrate including a plurality of individual electrodes arranged and formed in a predetermined direction on one surface of the substrate and also including a common electrode formed on the other surface in opposition to said plurality of individual electrodes; and a plurality of aperture portions which are switched between a light-transmitting state and a light cut-off state by controlling voltage between said opposite electrodes, light incident on said aperture portions being modulated;

wherein said plurality of individual electrodes are constructed of a plurality of primary electrodes formed at equal pitches in said predetermined direction and a plurality of secondary electrodes formed at equal pitches in said predetermined direction so that said secondary electrodes are respectively located between said primary electrodes; and wherein said primary electrode and said secondary electrodes across said primary electrode constitute each of said aperture portions.

7. The optical modulation element as set forth in claims 6, wherein said primary electrodes and said secondary electrodes are alternately formed in a single row in said predetermined direction.

8. The optical modulation element as set forth in claim 6, wherein said primary electrodes are formed in a single row in said predetermined direction; and said secondary electrodes are formed in a single row in said predetermined direction at positions different from said primary electrodes in a direction perpendicular to said predetermined direction so that said secondary electrodes are located between said primary electrodes formed in a single row.

* * * * *